United States Patent [19]

Sivertsen et al.

[11] 4,351,124
[45] Sep. 28, 1982

[54] FILM MOUNT WITH PROTECTED FACE SHEET

[75] Inventors: Marvin L. Sivertsen, Milwaukee; Valentine S. Sobolewski, Muskego, both of Wis.

[73] Assignee: General Electric Company, Milwaukee, Wis.

[21] Appl. No.: 224,910

[22] Filed: Jan. 14, 1981

[51] Int. Cl.³ .............................................. G09F 1/10
[52] U.S. Cl. ............................... 40/158 B; 40/158 R; 40/156
[58] Field of Search ............. 40/158 R, 158 A, 158 B, 40/159, 156, 2 R, 615; 428/40, 41, 42, 14; 156/108

[56] References Cited

U.S. PATENT DOCUMENTS

| | | | |
|---|---|---|---|
| 1,506,415 | 8/1924 | Dewey | 156/338 |
| 2,291,173 | 7/1942 | Simpson | 40/158 B |
| 2,598,755 | 6/1952 | Birch | 156/249 |
| 2,679,928 | 6/1954 | Bishop et al. | 428/41 |
| 2,896,351 | 7/1959 | Johnson | 428/41 |
| 3,383,121 | 5/1968 | Singer | 428/41 |
| 3,536,555 | 10/1970 | Thompson, Jr. | 156/108 |
| 3,546,053 | 12/1970 | Goldberg et al. | 156/291 |
| 3,564,745 | 2/1971 | Johnson et al. | 40/158 B |
| 3,592,722 | 7/1971 | Morgan | 428/40 |
| 3,810,566 | 5/1974 | Adams et al. | 40/158 R |
| 3,873,405 | 3/1975 | Wilkes | 40/158 B |
| 4,039,705 | 8/1977 | Douck et al. | 428/40 |
| 4,077,830 | 3/1978 | Fulwiler | 428/40 |
| 4,231,833 | 11/1980 | Lieberman | 40/158 R |
| 4,264,657 | 4/1981 | Tollette | 428/40 |

FOREIGN PATENT DOCUMENTS

| | | | |
|---|---|---|---|
| 1472297 | 9/1969 | Fed. Rep. of Germany | 40/158 B |
| 58237 | 9/1953 | France | 40/158 B |

OTHER PUBLICATIONS

"Adhesives-Prescription for Profits" by Donald E. Hegland from *Production Engineering*, Mar. 1979 issue, pp. 34-39.

*Primary Examiner*—Gene Mancene
*Assistant Examiner*—John J. Wilson
*Attorney, Agent, or Firm*—Dana F. Bigelow; Douglas E. Stoner

[57] ABSTRACT

A film-mount structure comprises a relatively stiff face sheet and a backing sheet which can be peeled off to expose an adhesive for receiving, in a removable and replaceable manner, a film strip for retention and viewing. In order to protect the cellulose-based face sheet from partial separation when the radiographic film is peeled from the adhesive surface, a thin mylar sheet is adhesively attached in a substantially permanent manner to the face sheet, and the releasable adhesive is applied directly to the other side of the mylar sheet. In this way, the film mounts' reusable feature is retained while maintaining the integrity of the face sheet.

20 Claims, 3 Drawing Figures

FILM MOUNT WITH PROTECTED FACE SHEET

BACKGROUND OF THE INVENTION

This invention relates generally to film mount structures and, more particularly, to structures for the convenient mounting, viewing, handling, and storing of exposed x-ray film strips.

In the medical field, it is common to record x-rays on photographic film, usually by way of a roll of film which is subsequently cut into a number of film strips, with each of those strips in turn having a number of frames. In order to accommodate the viewing, handling, and storing of those film strips, it is common to mount a number of these strips in a mounting device. Such device can be attached to the front of a uniform light source, or viewer, in order to view and analyze the films. After use, the mounting device, with its installed films, can be stored in the files for subsequent use.

One such mounting device is described in U.S. Pat. application Ser. No. 159,956, assigned to the assignee of the present invention and incorporated herein by reference. The film-mount structure described in that application comprises an apertured face sheet having an adhesive applied to the rear side thereof for receiving a backing sheet which, when removed in whole or in part, exposes the adhesive surface for receiving the film strips in a manner which allows them to be retained in position for subsequent handling. The type of glue, however, is carefully chosen, such that the relative bondings between the film and the adhesive and between the face sheet and the adhesive are such that the film can be removed and replaced without any significant damage to the integrity of the face sheet or to the adhesive coating thereon.

Because of cost considerations, it is desirable to fabricate the face sheet of a relatively inexpensive material such as "tag board," a commonly available wood-pulp product. In accordance with the above-mentioned structure, the adhesive then is applied directly to one side of the tag board. If the removable/replaceable feature is to work, the adhesive chosen then has to be of a nature such that the bond between the film and the adhesive is less than that between the tag board and the adhesive. However, even if this condition is met, it may be that the internal bonding of the tag board itself is less than the bonding between the film and the adhesive, in which case the tag board will experience a partial, or possibly even total, separation. If this occurs, portions of the tag board will be torn off and will stick to the film by way of the adhesive, thereby possibly causing damage to the film and to the mount structure itself.

It is therefore the object of the present invention to provide an improved film mount which will overcome the deficiencies described hereinabove.

Another object of the present invention is the provison for a film mount having a cellulose-based face sheet.

Still another object of the present invention is the provision for a film mount which allows the repeated removal of film strips from an adhesive-laden, cellulose-based face sheet without incurring damage to the face sheet, adhesive, or the film.

Yet another object of the present invention is the provision for a film mount which is economical to manufacture and extremely functional in use.

These objects and other features and advantages become more readily apparent on reference to the following description taken in conjunction with the appended drawings.

SUMMARY OF THE PRESENT INVENTION

Briefly, and in accordance with one aspect of the invention, the face sheet of the film mount is protected from internal separation by the placing of a thin polyester sheet between the face sheet and the adhesive coating. The adhesive is then applied directly to the polyester sheet, rather than to the face sheet, and the polyester sheet is, in turn, attached to the face sheet in a substantially permanent fashion by way of an adhesive having a higher bonding characteristic than the adhesive on the other side of the polyester film. In this way, the integrity of the face sheet is not threatened by the removal of the film strip from the adhesive since the securely bonded polyester sheet protects it from any separation which might occur as described hereinabove.

In the drawings, as hereinafter described, the preferred emobodiment is depicted; however, various other modifications and alternate constructions can be made thereto without departing from the true spirit and scope of the invention.

DESCRIPTION OF THE PREFERRED EMBODIMENT

Figure 1:
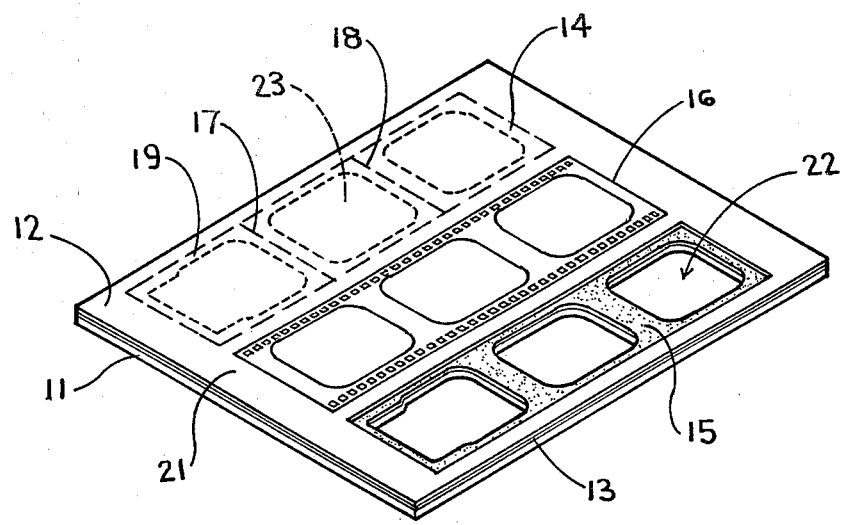
FIG. 1 is a perspective view of the film-mount structure in accordance with the preferred embodiment of the invention.

The present invention is shown generally in FIG. 1 and comprises a face sheet 11 and a backing sheet 12, with a protective polyester sheet, film, or layer 13 sandwiched therebetween. Particular types of adhesives are applied both between the polyester layer 13 and the face sheet 11 and between the polyester layer 13 and the backing sheet 12, as will be more fully described hereinafter.

It should be recognized that the particular design of the film mount, and that of its face sheet 11 and backing sheet 12, may take any of a number of forms. For example, the backing sheet 12 may be a single sheet which, when removed, will expose the entire adhesive-laden surface above the face sheet 11. In the preferred embodiment as shown, however, the backing sheet comprises, after selected die-cutting procedures have been performed, three parallel strips 14 disposed in close, adjacent relationship, such that any one or all can be individually removed to expose the relatively low-bond adhesive 15 for receiving a film strip 16 thereon. The term "low bond" as used with this adhesive shall mean, for purposes of this description, one which allows the peeling away of the backing sheet 12 and the subsequent application, removal, and reapplication, in a bonding manner, of a film strip 16. The film mount illustrated in FIG. 1 has two of its three backing sheet strips 14 removed and a film strip 16 placed in one of the two positions.

It will be seen that, in addition to the fact that the backing sheet 12 is die cut to provide three backing sheet strips 14, each of these strips is further die cut at two intermediate positions 17 and 18 so as to thereby provide three adjacent panels 19, any of which can be individually removed to provide an aperture for receiving a single radiographic film frame. Regardless of whether a single or a plurality of panels 19 are removed, a structural framework portion 21 of the backing sheet 12 is left to act as a guide for the placement of the film frames or strips 14 therein.

The backing sheet 12 is fabricated of a relatively light and flexible paper-based material which adheres to the low-bond adhesive 15 in such a manner as to allow for the easy removal of the individual strips 14 or panels 19 but, at the same time, allowing for the permanent adherence of the framework portion 21. A material which has been found to be suitable for use as this backing sheet is one which is commercially available and is described as 50 pound, clay-coated on one side, craft, silicone-release liner. Generally, this material can be described as being relatively granular and porous on its one side and relatively non-porous and "slick" on the side which attaches to the adhesive.

Referring now to the face sheet 11 portion of the mount structure as shown in FIG. 1, it is fabricated of a light-weight, relatively stiff material which acts to form the basic framework of the mount structure. The sheet has a plurality (nine in the embodiment shown) of apertures 22 formed therein as by die cutting of the included tabs 23 (three shown) to provide windows for the individual frames of the film strips. In the initial fabrication and cutting, the individual tabs 23 are left in their corresponding apertures 22 until such time as it becomes necessary and desirable to place a film strip therein for viewing. At that time, the tab or tabs are then removed, preferably along with the backing sheet as described in the above-referenced patent application.

Figure 2:
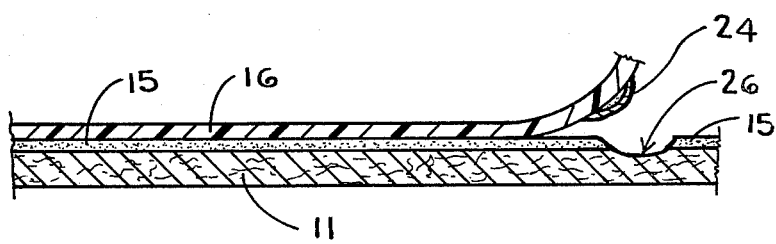
FIG. 2 is an enlarged, fragmentary sectional view of a mount without the protective layer.

In that application, one of the suggested materials for the face sheet 11 was tag board, which is a low-cost, light-weight material made from wood pulp. Although otherwise preferred, such a material has a tendency to internally separate when exposed to highly localized stresses. For example, when the low-bond adhesive 15 is applied directly to the tag board face sheet 11, as suggested in one embodiment of the above-referenced patent application, and as shown in FIG. 2 hereof, there is a tendency, when a film strip 16 is applied and subsequently peeled away, to pull or tear away a portion 24 of the face sheet 11 at points where the internal bonding of the face sheet is inadequate. This will occur if the adhesive bond between the film strip 16 and the adhesive 15 is sufficiently greater than that of the internal bond at a particular location within the face sheet 11. As a result, a hole 26 is left in the face sheet 11, and the face sheet portion 24, along with some of the adhesive 15, is left on the film 16, both conditions of which are highly undesirable.

Figure 3:
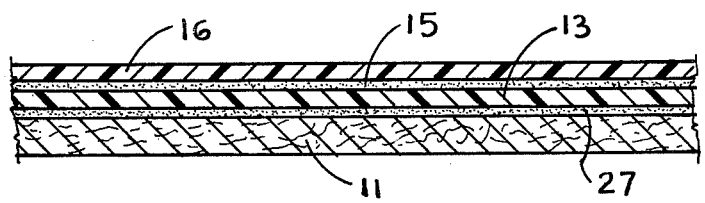
FIG. 3 is an enlarged, fragmentary sectional view of a mount with the protective layer in accordance with the present invention.

The Applicants have recognized the above-described problem and, having a desire to continue use of a cellulose-based material, such as tag board, have devised the present protective structure for the face sheet 11 as shown in FIG. 3.

Disposed on the one side of the face sheet 11, in a substantially permanent manner, is the protective sheet, film, or layer 13 which acts to interface with the film strip 16 by way of the low-bond adhesive 15 in much the same way as the face sheet 11 interfaces with the film strip 16 as shown in FIG. 2. However, the internal strength of the protective sheet 13 is sufficient to prevent any separation as described hereinabove. Further, the protective sheet 13 and the manner in which it is applied to the face sheet 11 prevents any separation of the face sheet in that manner. This preventation is accomplished in two ways. First, the protective sheet 13 is applied to the face sheet 11 by way of a relatively high-bond adhesive 27 which is applied in liquid form and which dries to form a substantially permanent bond. Thus, the high-bond adhesive 27 tends to penetrate deeper into the face sheet 11 than does the so-called low-bond adhesive 15 and, when dried, it tends to lend strength to the face sheet 11 itself. Second, the presence of the protective sheet 13 between the face sheet 11 and the relatively high local stresses, which may occur when the film strip 16 is peeled away, tends to distribute the stresses over a wider area of the face sheet 11.

Whereas any type of polyester, plastic, foil, or other suitable material may be used for the protective layer 13 as described hereinabove, a preferred material is one which is commercially available under the name "Mylar" TM from E. I. DuPont de Nemour & Co. The particular thickness of the material may be chosen to suit any of various other needs; however, a thickness of 0.0005 in. has been found to be satisfactory for purposes of economy, ease of application, and functionality. Similarly, any of a number of types of high-bond adhesives 27 may be used in the manner described hereinabove.

Other features and advantages characteristic of the film mount described in the above-referenced patent application are not substantially affected by the modification proposed in the present application. For example, the die-cut operations, which are performed on each side of the film mount to obtain the necessary cuts and perforations, are still possible with the present embodiment. This involves only two cutting operations, first, through a combination of the face sheet 11, the high-bond adhesive 27, the polyester film 13, and the low-bond adhesive 15, and second, from the other side, through the backing sheet 12, and the low-bond adhesive 15.

While the present invention has been shown and described in terms of a specific embodiment, it will be understood that other modifications and improvements will be apparent to those skilled in the art.

We claim:

1. A radiographic film-mounting frame for receiving and retaining radiographic film strips for illumination and viewing comprising:
   (a) a face sheet having a plurality of apertures formed therein, said apertures being filled with tabs which, when selectively removed, accommodate the placement of film strips in overlying and overlapping relationship with said apertures for viewing;
   (b) a thin protective sheet attached in a substantially permanent manner on its one side to said face sheet so as to cover and protect at least that portion of the face sheet which would otherwise interface with said overlapping portion of the film strip, and having an adhesive material applied to its other side; and
   (c) a backing sheet attached to said adhesive material and being removable in whole or in part to expose a portion of said adhesive material for receiving and retaining a film strip in a manner which allows the subsequent removal and replacement of said film strip without any substantial degradation to the integrity of the mount.

2. A film-mounting frame as set forth in claim 1 wherein said face sheet is comprised of a cellulose-based material.

3. A film-mounting frame as set forth in claim 2 wherein said face sheet is comprised of a tag-board material.

4. A film-mounting frame as set forth in claim 1 wherein said thin protective sheet is attached to said face sheet by another adhesive material.

5. A fim-mounting frame as set forth in claim 4 wherein said other adhesive material is of a type which is liquid in form when applied and which dries to a substantially permanent form.

6. A film-mounting frame as set forth in claim 1 wherein said thin protective sheet is comprised of a polyester material.

7. A film-mounting frame as set forth in claim 6 wherein said thin protective sheet is comprised of a Mylar material.

8. A film-mounting frame as set forth in claim 1 wherein said thin protective sheet is of a thickness between 0.0003 and 0.0007 in.

9. A film-mounting frame as set forth in claim 8 wherein said thin film sheet is substantially 0.0005 in. thick.

10. A film-mounting frame as set forth in claim 1 wherein the combination of said face sheet and protective sheet is such as to allow for a die cutting first through the face sheet and then through the protective sheet in one operation.

11. An improved radiographic film mounting frame of the type having face and backing sheets adhesively attached in a temporary manner such that at least a portion of the backing sheet can be removed to expose an adhesive remaining on the mount such that a film strip can be applied to the adhesive for retention and viewing, said face sheet having at least one aperture therethrough for allowing illumination of said radiographic film, wherein the improvement comprises a thin protective sheet disposed between said face sheet and said adhesive so that when the film strip is applied to the adhesive, it does not attach directly to said face sheet but rather to said protective sheet which will allow a subsequent removal and replacement of the film strip without any degradation in the integrity of the face sheet.

12. An improved film-mounting frame as set forth in claim 11 wherein said face sheet is comprised of a cellulose-based material.

13. An improved film-mounting frame as set forth in claim 12 wherein said face sheet is comprised of a tag-board material.

14. An improved film-mounting frame as set forth in claim 11 wherein said protective sheet is attached to said face sheet by another adhesive.

15. An improved film-mounting frame as set forth in claim 14 wherein said other adhesive is liquid in form when applied and dries to a substantially permanent form.

16. An improved film-mounting frame as set forth in claim 11 wherein said protective sheet is comprised of a polyester material.

17. An improved film-mounting frame as set forth in claim 16 wherein said protective sheet is comprised of a Mylar material.

18. An improved film-mounting frame as set forth in claim 11 wherein said protective sheet has a thickness in the range of 0.0003 to 0.0007 in.

19. An improved film-mounting frame as set forth in claim 18 wherein said thickness of said protective sheet is substantially 0.0005 in.

20. An improved film-mounting frame as set forth in claim 11 wherein said face sheet and said protective sheet are combined in such a manner as to allow for the die cutting through the combination with a single die-cutting operation.

* * * * *